(12) United States Patent
Tsai et al.

(10) Patent No.: US 10,419,708 B2
(45) Date of Patent: Sep. 17, 2019

(54) IMAGE PROCESSING CIRCUIT AND IMAGE CONTRAST ENHANCEMENT METHOD THEREOF

(71) Applicant: Novatek Microelectronics Corp., Hsinchu (TW)

(72) Inventors: Wan-Ching Tsai, Taipei (TW); Chih-Chia Kuo, Hsinchu County (TW)

(73) Assignee: Novatek Microelectronics Corp., Hsinchu (TW)

( * ) Notice: Subject to any disclaimer, the term of this patent is extended or adjusted under 35 U.S.C. 154(b) by 66 days.

(21) Appl. No.: 14/690,482

(22) Filed: Apr. 20, 2015

(65) Prior Publication Data

US 2016/0309112 A1  Oct. 20, 2016

(51) Int. Cl.
*H04N 5/57* (2006.01)
*H04N 9/12* (2006.01)
*G09G 3/34* (2006.01)

(52) U.S. Cl.
CPC ............ *H04N 5/57* (2013.01); *G09G 3/3426* (2013.01); *H04N 9/12* (2013.01); *G09G 2320/0271* (2013.01); *G09G 2320/0646* (2013.01); *G09G 2320/0653* (2013.01); *G09G 2330/021* (2013.01)

(58) Field of Classification Search
None
See application file for complete search history.

(56) References Cited

U.S. PATENT DOCUMENTS

| | | | | |
|---|---|---|---|---|
| 2008/0252666 A1* | 10/2008 | Chen | .................... | G09G 3/2044 345/690 |
| 2009/0097747 A1* | 4/2009 | Chen | ...................... | G06T 5/008 382/169 |
| 2009/0141178 A1* | 6/2009 | Kerofsky | ............. | G09G 3/3426 348/700 |
| 2011/0050743 A1* | 3/2011 | Park | .................. | G02F 1/133603 345/690 |
| 2011/0157237 A1* | 6/2011 | Chen | .................... | G09G 3/3426 345/690 |
| 2014/0327704 A1* | 11/2014 | Wei | ...................... | G09G 3/3406 345/690 |
| 2015/0348500 A1* | 12/2015 | Lin | ...................... | G09G 3/3406 345/600 |

* cited by examiner

*Primary Examiner* — Christopher R Lamb
(74) *Attorney, Agent, or Firm* — JCIPRNET

(57) ABSTRACT

An image processing circuit and an image contrast enhancement method of the imaging processing circuit are provided. The image processing circuit includes an index generating unit, a data compensation unit, and a data gain unit. The index generating unit receives a plurality of pixel data of a first frame to provide a plurality of local curve indices corresponding to a plurality of display areas of a display panel. The data compensation unit selects parts of a plurality of gray-level transformation curves respectively corresponding to the pixel data according to the local curve indices, so as to regulate the pixel data and then provide a plurality compensated pixel data. The data gain unit determines a data gain according to a backlight duty cycle signal and regulates the compensated pixel data according to the data gain, so as to provide a plurality of enhanced pixel data.

33 Claims, 4 Drawing Sheets

IMAGE PROCESSING CIRCUIT AND IMAGE CONTRAST ENHANCEMENT METHOD THEREOF

FIELD OF THE INVENTION

The invention relates a data processing circuit; in particular, the invention relates to an image processing circuit and an image contrast enhancement method thereof.

DESCRIPTION OF RELATED ART

Among various flat panel displays, liquid crystal displays (LCDs) characterized by low voltage operation, no radiation, light weight, and compactness have become the main stream products. An LCD is substantially composed of a backlight module and a display panel, and the backlight module provides a backlight source required by the LCD for displaying images. To reduce power consumption of the LCD, the brightness of the backlight source is dynamically adjusted, which may however pose a negative impact on the image display. Hence, how to retain or enhance the quality of the displayed image after the adjustment of the brightness of the backlight source has drawn attention from designers of the LCD.

SUMMARY OF THE INVENTION

The invention is directed to an image processing circuit and an image contrast enhancement method thereof, whereby image contrast can be enhanced without consuming significant power.

In an embodiment of the invention, an image processing circuit includes an index generating unit, a data compensation unit, and a data gain unit. The index generating unit receives a plurality of pixel data of a first frame to provide a plurality of local curve indices corresponding to a plurality of display areas of a display panel. Here, each of the pixel data respectively corresponds to one of the display areas. The data compensation unit is coupled to the index generating unit. The data compensation unit receives the pixel data and the local curve indices, so as to select parts of a plurality of gray-level transformation curves respectively corresponding to the pixel data according to the local curve indices, and the data compensation unit provides a plurality of compensated pixel data after regulating the pixel data according to the corresponding parts of the gray-level transformation curves. The data gain unit is coupled to the data compensation unit and receives a backlight duty cycle signal and the compensated pixel data, so as to determine a data gain according to the backlight duty cycle signal. After regulating the compensated pixel data according to the data gain, the data gain unit provides a plurality of enhanced pixel data.

In an embodiment of the invention, an image contrast enhancement method of an image processing circuit includes following steps. Local curve indices corresponding to a plurality of display areas of a display panel are provided by an index generating unit according to a plurality of pixel data of a first frame, and each of the pixel data respectively corresponds to one of the display areas. Parts of a plurality of gray-level transformation curves respectively corresponding to the pixel data are selected by a data compensation unit according to the local curve indices; after regulating the pixel data according to the corresponding parts of the gray-level transformation curves, compensated pixel data are provided. A data gain is determined by a data gain unit according to a backlight duty cycle signal, and the compensated pixel data are regulated according to the data gain, so as to provide a plurality of enhanced pixel data.

In light of the foregoing, according to the image processing circuit and the image contrast enhancement method thereof, the gray-level transformation curves corresponding to the pixel data are determined according to the pixel data of the display areas, so as to enhance the pixel data. In addition, the enhanced pixel data can be further regulated according to the backlight brightness, such that the enhanced pixel data may be changed together with changes to the brightness of the planar light source of the backlight module. As such, the image contrast can be enhanced without consuming significant power.

Several exemplary embodiments accompanied with figures are described in detail below to further describe the invention in details.

DESCRIPTION OF EMBODIMENTS

Figure 1:
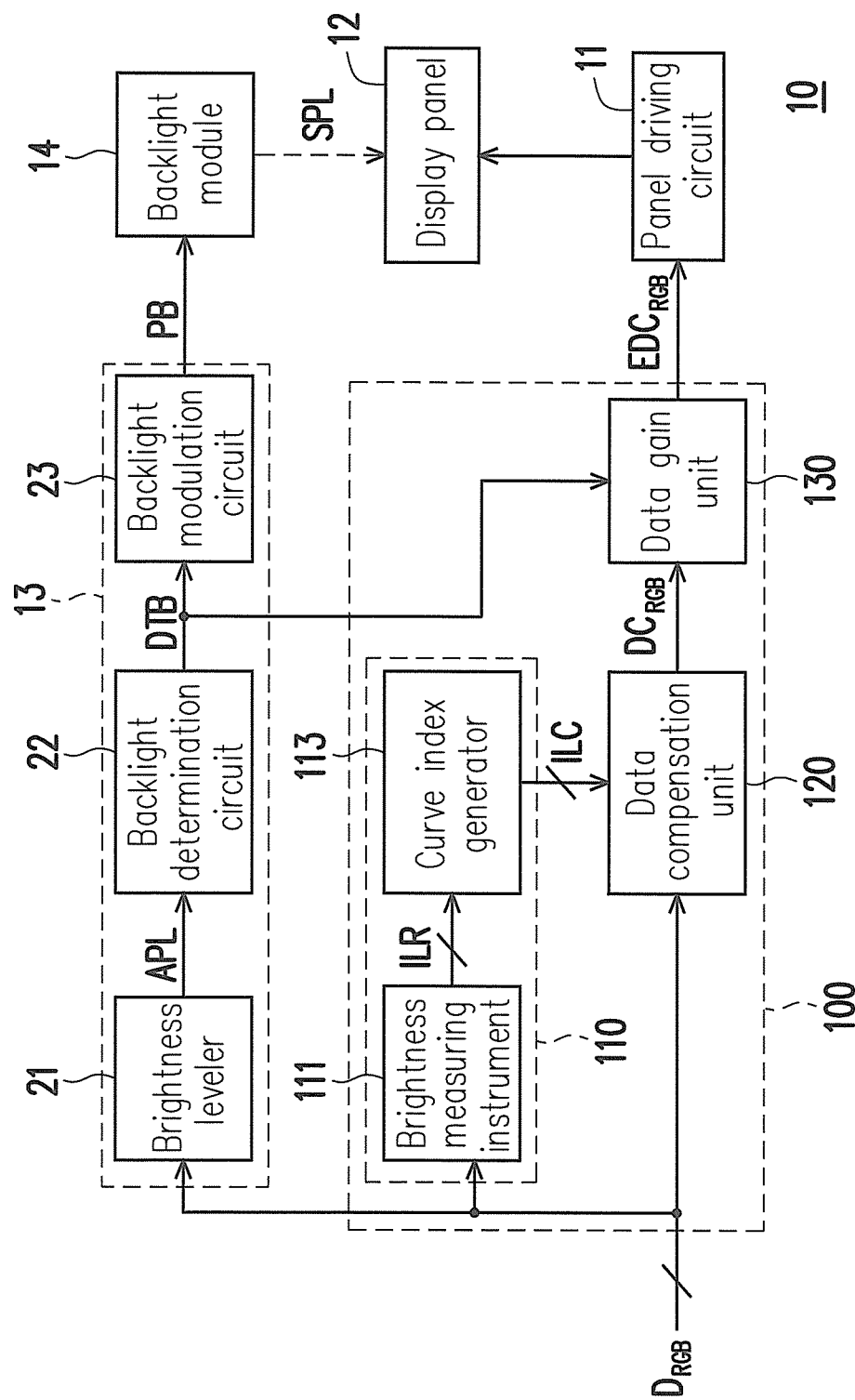
FIG. 1 is a systematic diagram schematically illustrating a display apparatus according to an embodiment of the invention.

FIG. 1 is a systematic diagram schematically illustrating a display apparatus according to an embodiment of the invention. With reference to FIG. 1, in the present embodiment, the display apparatus 10 includes, for instance, an image processing circuit 100, a panel driving circuit 11, a display panel 12, a backlight driving circuit 13, and a backlight module 14. Here, the backlight module 14 is globally dimmed.

After the backlight driving circuit 13 receives a plurality of pixel data $D_{RGB}$ of a current frame (corresponding to a first frame), the backlight driving circuit 13 correspondingly provides a backlight pulse signal PB to the backlight module 14, so as to drive the backlight module 14 to provide a planar light source SPL with uniform brightness. At the same time, the backlight driving circuit 13 provides a backlight duty cycle signal DTB corresponding to the pixel data $D_{RGB}$ to the image processing circuit 100. The image processing circuit 100 receives the pixel data $D_{RGB}$ and the backlight duty cycle signal DTB, so as to enhance the pixel data according to the backlight duty cycle signal DTB; after that, the image processing circuit 100 provides a plurality of enhanced pixel data $EDC_{RGB}$ to the panel driving circuit 11. The panel driving circuit 11 then displays corresponding images according to the received enhanced pixel data $EDC_{RGB}$, and the images displayed on the display panel 12 are transmitted to eyes of a user via the planar light source SPL. Here, the display panel 12 is locally dimmed.

Figures 2, 3:
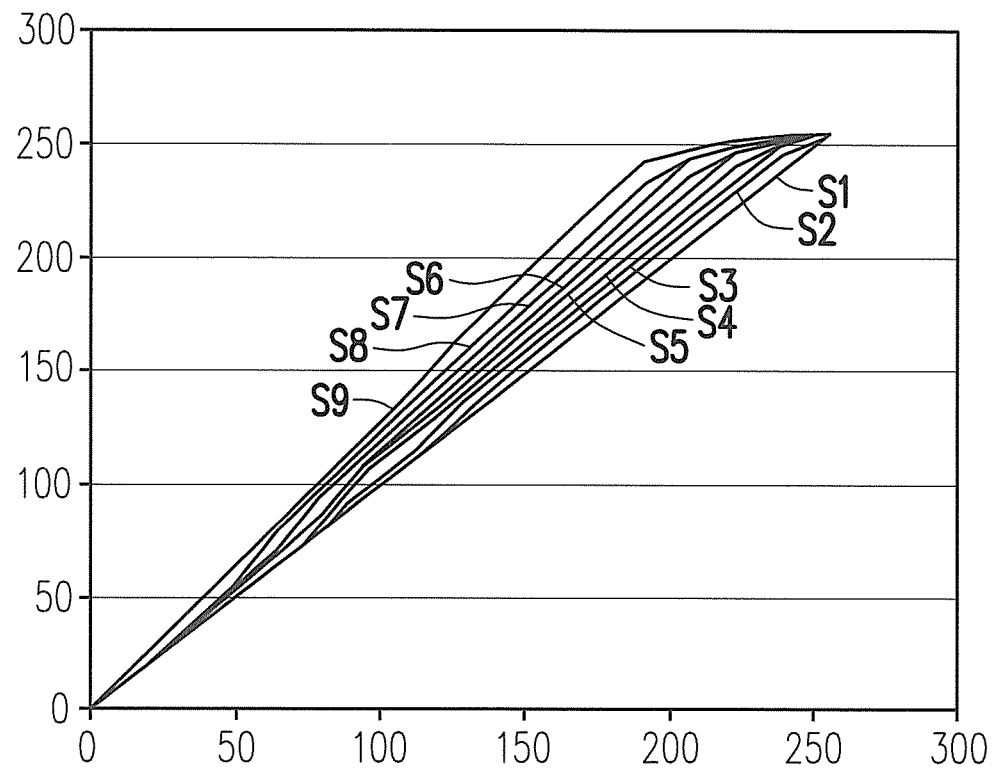
FIG. 2 is a schematic diagram illustrating display areas of a display panel according to an embodiment of the invention.
FIG. 3 is a schematic diagram illustrating gray-level transformation curves according to an embodiment of the invention.

FIG. 2 is a schematic diagram illustrating display areas of a display panel according to an embodiment of the invention. FIG. 3 is a schematic diagram illustrating gray-level transformation curves according to an embodiment of the invention. With reference to FIG. 1 to FIG. 3, in the present embodiment, the display panel 12 is divided into a plurality of display areas (e.g., A1-A16), and the image processing circuit 100 includes an index generating unit 110, a data compensation unit 120, and a data gain unit 130. Here, the horizontal axis in FIG. 3 shows the input gray-level value (i.e., the gray-level value of the pixel data $D_{RGB}$), and the vertical axis shows the output gray-level value (i.e., the gray-level value of the compensated pixel data $DC_{RGB}$). The gray-level transformation curves S1-S9 depicted in FIG. 3 are different from each other or one another.

The index generating unit 110 receives a plurality of pixel data $D_{RGB}$ to provide a plurality of local curve indices ILC corresponding to the display areas A1-A16 of the display panel 12. Each of the pixel data $D_{RGB}$ respectively corresponds to one of the display areas (e.g., A1-A16), and each of the display areas (e.g., A1-A16) corresponds to one of the local curve indices ILC. The index generating unit 110 calculates one of the local curve indices ILC corresponding to each of the display areas (e.g., A1-A16) according to the pixel data $D_{RGB}$ corresponding to the each of the display areas (e.g., A1-A16).

The data compensation unit 120 is coupled to the index generating unit 110 and receives the pixel data $D_{RGB}$ and the local curve indices ILC, so as to select parts of the gray-level transformation curves (e.g., S1-S9) according to the local curve indices ILC, and compensated pixel data $DC_{RGB}$ are provided after the pixel data $D_{RGB}$ are regulated according to the corresponding parts of the gray-level transformation curves (e.g., S1-S9). The data gain unit 130 is coupled to the data compensation unit 120 and receives the backlight duty cycle signal DTB from the backlight driving circuit 13 and the compensated pixel data $DC_{RGB}$, so as to determine a data gain according to the backlight duty cycle signal DTB. After regulating the compensated pixel data $DC_{RGB}$ according to the data gain, enhanced pixel data $EDC_{RGB}$ are provided.

Figures 4, 5:
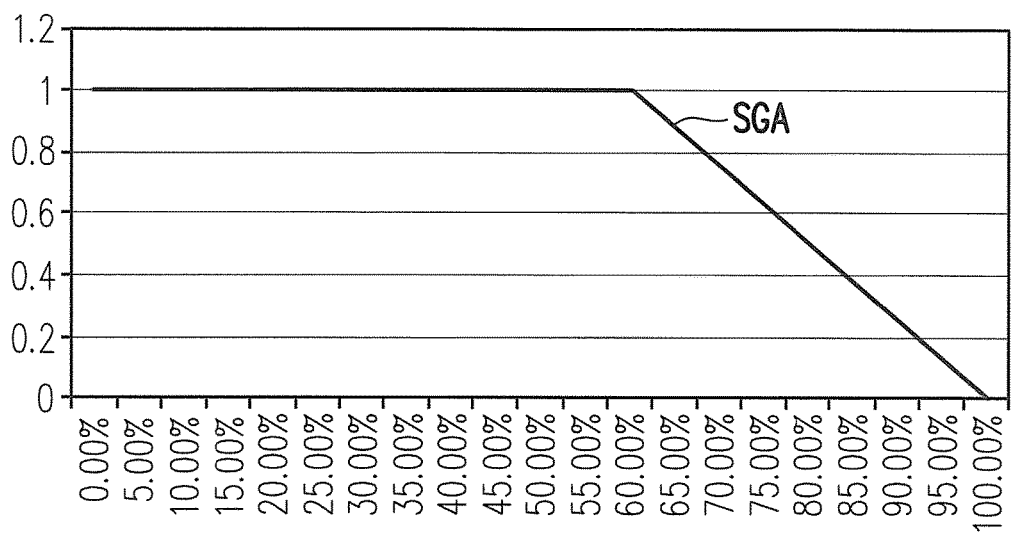
FIG. 4 is a schematic diagram illustrating distribution of pixels in display areas according to an embodiment of the invention.
FIG. 5 is a schematic curve illustrating data gains according to an embodiment of the invention.

FIG. 4 is a schematic diagram illustrating distribution of pixels in display areas according to an embodiment of the invention. With reference to FIG. 1 to FIG. 4, in the present embodiment, the display area A1 is assumed to include pixels P1-P9, the display area A2 is assumed to include pixels R1-R9, the display area A5 is assumed to include pixels Q1-Q9, and the display area A6 is assumed to include pixels N1-N9. The central pixels (e.g., P5, Q5, R5, and N5) of the display areas (e.g., A1-A16) correspond to the gray-level transformation curves (e.g., S1-S9) corresponding to the display areas (e.g., A1-A16).

If each of the pixel data $D_{RGB}$ is written into the central pixel (e.g., P5, Q5, R5, or N5) of one of the display areas (e.g., A1-A16), each of the pixel data $D_{RGB}$ corresponds to one of the gray-level transformation curves (e.g., S1-S9). If each of the pixel data $D_{RGB}$ is written into a target pixel located on a straight line (e.g., P6, P8, Q2, Q6, R4, R8, N2, and N4) constituted by the central pixels (e.g., P5, Q5, R5, or N5) in two adjacent display areas of the display areas (e.g., A1-A16), each of the pixel data $D_{RGB}$ corresponds to two of the gray-level transformation curves (e.g., S1-S9) corresponding to the central pixels (e.g., P5, Q5, R5, or N5) in the two adjacent display areas. If each of the pixel data $D_{RGB}$ is written into the target pixel located in a block constituted by the central pixels (e.g., P5, Q5, R5, or N5) in four adjacent display areas of the display areas (e.g., A1-A16), each of the pixel data $D_{RGB}$ corresponds to the gray-level transformation curves (e.g., S1-S9) corresponding to the central pixels (e.g., P5, Q5, R5, or N5) in the four adjacent display areas.

For instance, the pixel data $D_{RGB}$ written into the pixel P5 corresponds to one of the gray-level transformation curves (e.g., S1-S9). The pixel data $D_{RGB}$ written into the pixel P8 corresponds to the gray-level transformation curves (e.g., S1-S9) corresponding to the pixels P5 and Q5. If the pixels P5 and Q5 correspond to the same gray-level transformation curve (e.g., S1-S9), the compensated pixel data $DC_{RGB}$ corresponding to the pixel data $D_{RGB}$ are directly determined according to the gray-level transformation curve (e.g., S1-S9). If the pixels P5 and Q5 correspond to different gray-level transformation curves (e.g., S1-S9), the compensated pixel data $DC_{RGB}$ corresponding to the pixel data $D_{RGB}$ are determined according to an interpolation result of the gray-level transformation curves (e.g., S1-S9). The pixel data $D_{RGB}$ written into the pixel P9 corresponds to the gray-level transformation curves (e.g., S1-S9) corresponding to the pixels P5, Q5, R5, and N5. If the pixels P5, Q5, R5, and N5 correspond to the same gray-level transformation curve (e.g., S1-S9), the compensated pixel data $DC_{RGB}$ corresponding to the pixel data $D_{RGB}$ are directly determined according to the gray-level transformation curve (e.g., S1-S9). If the pixels P5, Q5, R5, and N5 correspond to different gray-level transformation curves (e.g., S1-S9), the compensated pixel data $DC_{RGB}$ corresponding to the pixel data $D_{RGB}$ are determined according to an interpolation result of the gray-level transformation curves (e.g., S1-S9).

FIG. 5 is a schematic curve illustrating data gains according to an embodiment of the invention. With reference to FIG. 1 and FIG. 5, the horizontal axis in FIG. 5 indicates the backlight brightness represented by the backlight duty cycle signal DTB, the vertical axis indicates data gains, and the curve SGA represents the data gains corresponding to the backlight brightness. If the backlight brightness indicated by the backlight duty cycle signal DTB is less than or equal to a backlight brightness threshold (e.g., 60%), the data gain is 1, and if the backlight brightness indicated by the backlight duty cycle signal DTB is greater than the backlight brightness threshold, the data gain is gradually reduced from 1 to 0 in response to an increase in the backlight brightness.

With reference to FIG. 1, FIG. 2, and FIG. 4, in the present embodiment, the index generating unit 110 includes a brightness measuring instrument 111 and a curve index generator 113. The brightness measuring instrument 111 receives the pixel data $D_{RGB}$ to provide a plurality of local reference indices ILR corresponding to the display areas (e.g., A1-A16); namely, each of the display areas (e.g., A1-A16) corresponds to one of the local reference indices ILR. The brightness measuring instrument 111 may provide each of the local reference indices ILR corresponding to one of the display areas (e.g., A1-A16) according to a gray-level average and a gray-level standard deviation of the pixel data $D_{RGB}$ corresponding to the one of the display areas (e.g., A1-A16).

The curve index generator 113 is coupled to the brightness measuring instrument 111 to receive the local reference indices ILR and calculates each of current curve indices corresponding to one of the display areas (e.g., A1-A16) according to one of the local reference indices ILR. The curve index generator 113 provides the local curve indices ILC corresponding to the display areas (e.g., A1-A16) according to the current curve indices corresponding to the display areas (e.g., A1-A16).

Particularly, if each of the local reference indices ILC corresponding to one of the display areas (e.g., A1-A16) is greater than an index threshold, each of the current curve indices corresponding to one of the display areas (e.g., A1-A16) is associated with each of the local reference indices ILR corresponding to one of the display areas (e.g., A1-A16). That is, each of the local reference indices ILC corresponding to one of the display areas (e.g., A1-A16) may serve as the current curve index of one of the display areas (e.g., A1-A16). If each of the local reference indices ILC corresponding to one of the display areas (e.g., A1-A16) is less than or equal to the index threshold, each of the current curve indices corresponding to one of the display areas (e.g., A1-A16) is associated with the local reference indices ILR corresponding to the one of the display areas (e.g., A1-A16) and the display areas adjacent to the one of the display areas. That is, the average or the weighted sum of the local reference indices ILC corresponding to one of the display areas (e.g., A1-A16) and the display areas adjacent to the one of the display areas may serve as the current curve index of the one of the display areas (e.g., A1-A16).

If each of the current curve indices corresponding to one of the display areas (e.g., A1-A16) is associated with the local reference indices ILR corresponding to the one of the display areas (e.g., A1-A16) and the display areas adjacent to the one of the display areas (e.g., A1-A16), the number of the display areas adjacent to the one of the display areas (e.g., A1-A16) applied by the curve index generator 113 is in inverse proportion to each of the local reference indices ILR corresponding to one of the display areas (e.g., A1-A16). In response to the decrease in the local reference indices ILR, the current curve indices gradually approach the average of the local reference indices, and the gray-level curves in the display areas (e.g., A1-A16) vary in a small range; in response to the increase in the local reference indices ILR, the current curve indices move away from the average, and the gray-level curves in the display areas (e.g., A1-A16) vary in a wide range.

In another aspect, if the current frame and a preceding frame (corresponding to a second frame) are continuous frames, the curve index generator 111 provides one of the local curve indices ILC corresponding to each of the display areas (e.g., A1-A16) according to the current curve index and preceding curve index corresponding to the each of the display areas (e.g., A1-A16). If the current frame and the preceding frame are not continuous frames, the curve index generator 111 allows the current curve index corresponding to each of the display areas (e.g., A1-A16) to be the local curve indices corresponding to the each of the display areas (e.g., A1-A16).

With reference to FIG. 1, in the present embodiment, the backlight driving circuit 13 includes a brightness leveler 21, a backlight determination circuit 22, and a backlight modulation circuit 23. The brightness leveler 21 calculates an average pixel level APL after receiving the pixel data $D_{RGB}$. The backlight determination circuit 22 receives the average pixel level APL to correspondingly provide the backlight duty cycle signal DTB. The backlight modulation circuit 23 receives the backlight duty cycle signal DTB to correspondingly provide the backlight pulse signal PB to the backlight module 14.

Figure 6:
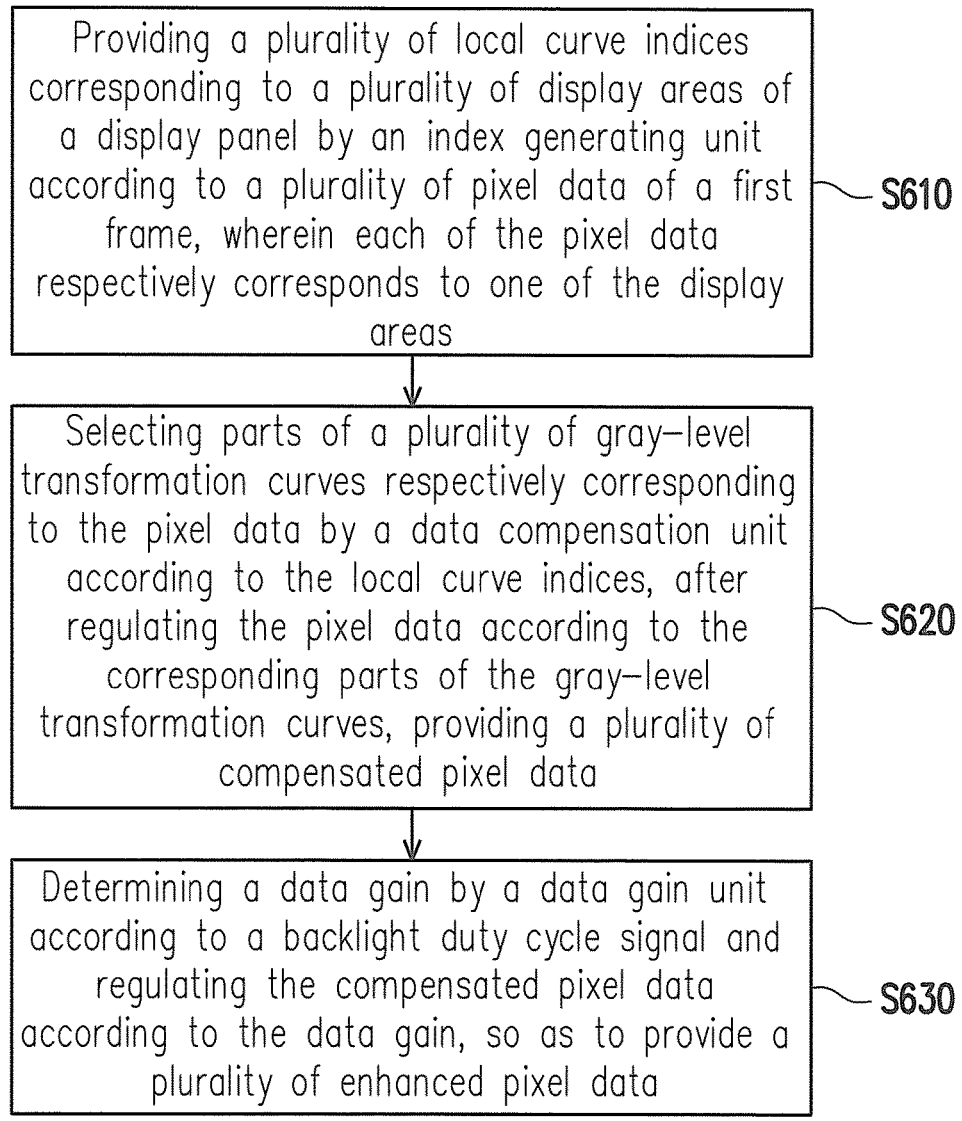
FIG. 6 is a flowchart illustrating an image contrast enhancement method according to an embodiment of the invention.

FIG. 6 is a flowchart illustrating an image contrast enhancement method according to an embodiment of the invention. With reference to FIG. 6, the image contrast enhancement method at least includes following steps. In step S610, local curve indices corresponding to a plurality of display areas of a display panel are provided by an index generating unit according to a plurality of pixel data of a first frame, and each of the pixel data respectively corresponds to one of the display areas. In step S620, parts of a plurality of gray-level transformation curves respectively corresponding to the pixel data are selected by a data compensation unit according to the local curve indices; after regulating the pixel data according to the corresponding parts of the gray-level transformation curves, compensated pixel data are provided. In step S630, a data gain is determined by a data gain unit according to a backlight duty cycle signal, and the compensated pixel data are regulated according to the data gain, so as to provide a plurality of enhanced pixel data. The order of the steps S610, S620, and S630 serves to explain the invention but should not be construed as limitations to the invention. Detailed descriptions of the steps S610, S620, and S630 are provided in the embodiments respectively shown in FIG. 1 to FIG. 5 and thus will not be further provided hereinafter.

To sum up, according to the image processing circuit and the image contrast enhancement method thereof, the gray-level transformation curves corresponding to the pixel data are determined according to the pixel data of the display areas, so as to enhance the pixel data. In addition, the enhanced pixel data can be further regulated according to the backlight brightness, such that the enhanced pixel data may be changed together with the brightness of the planar light source of the backlight module. As such, the image contrast can be enhanced without consuming significant power.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. An image processing circuit comprising:
an index generating unit receiving a plurality of pixel data of a first frame to provide a plurality of local curve indices corresponding to a plurality of display areas of a display panel, wherein each of the pixel data respectively corresponds to one of the display areas and each of the display areas includes a plurality of pixels, if the first frame and a preceding second frame are continuous frames, the local curve indices respectively corresponding to the display areas are determined according to current curve indices and preceding curve indices corresponding to the display areas, and if the first frame and the second frame are not continuous frames, the local curve indices respectively corresponding to the display areas are determined to be the current curve indices corresponding to the display areas, wherein the current curve indices are determined by the pixel data of the first frame;
a data compensation unit coupled to the index generating unit, the data compensation unit receiving the pixel data and the local curve indices, so as to select one or more gray-level transformation curves from a plurality of gray-level transformation curves for each pixel according to the local curve indices, the data compensation unit providing a plurality of compensated pixel data after regulating the pixel data for each pixel according to a respective gray-level transformation curve for the pixel, wherein the respective gray-level transformation curve for one of a part of the pixels is one of the gray-level transformation curves, and the respective gray-level transformation curve for one of another part of the pixels is an interpolation result of at least two of the gray-level transformation curves; and
a data gain unit coupled to the data compensation unit, the data gain unit receiving a backlight duty cycle signal and the compensated pixel data, so as to determine at least one data gain according to the backlight duty cycle signal, after regulating the compensated pixel data according to the at least one data gain, the data gain unit providing a plurality of enhanced pixel data.

2. The image processing circuit of claim 1, wherein the gray-level transformation curves are different from each other or one another.

3. The image processing circuit of claim 1, wherein
if each of the pixel data is written into a central pixel of one of the display areas, each of the pixel data corresponds to one of the gray-level transformation curves,
if each of the pixel data is written into a target pixel located on a straight line constituted by the central pixels in two adjacent display areas of the display areas, each of the pixel data corresponds to the gray-level transformation curves corresponding to the central pixels in the two adjacent display areas, and
if each of the pixel data is written into the target pixel located in a block constituted by the central pixels in four adjacent display areas of the display areas, each of the pixel data corresponds to the gray-level transformation curves corresponding to the central pixels in the four adjacent display areas.

4. The image processing circuit of claim 1, wherein if a backlight brightness indicated by the backlight duty cycle signal is less than or equal to a backlight brightness threshold, the data gain is 1, and if the backlight brightness indicated by the backlight duty cycle signal is greater than the backlight brightness threshold, the data gain is gradually reduced from 1 to 0 in response to an increase in the backlight brightness.

5. The image processing circuit of claim 1, wherein the index generating unit calculates each of the local curve indices corresponding to each of the display areas according to the pixel data corresponding to the each of the display areas.

6. The image processing circuit of claim 5, wherein the index generating unit comprises:
a brightness measuring instrument receiving the pixel data of the first frame to provide a plurality of local reference indices corresponding to the display areas; and
a curve index generator coupled to the brightness measuring instrument to receive the local reference indices, the curve index generator calculating a plurality of the current curve indices corresponding to the display areas according to the local reference indices and providing the local curve indices corresponding to the display areas according to the current curve indices corresponding to the display areas.

7. The image processing circuit of claim 6, wherein the brightness measuring instrument provides each of the local reference indices corresponding to one of the display areas according to a gray-level average and a gray-level standard deviation of the pixel data corresponding to the one of the display areas.

8. The image processing circuit of claim 6, wherein if the first frame and the preceding second frame are continuous frames, the curve index generator of the index generating unit provides the local curve indices respectively corresponding to the display areas according to the current curve indices and the preceding curve indices corresponding to the display areas, and if the first frame and the second frame are not continuous frames, the curve index generator allows the current curve indices corresponding to the display areas to be the local curve indices corresponding to the display areas.

9. The image processing circuit of claim 6, wherein if each of the local reference indices corresponding to one of the display areas is greater than an index threshold, each of the current curve indices corresponding to one of the display areas is associated with each of the local reference indices corresponding to the one of the display areas, and if each of the local reference indices corresponding to one of the display areas is less than or equal to the index threshold, each of the current curve indices corresponding to one of the display areas is associated with the local reference indices corresponding to the one of the display areas and the display areas adjacent to the one of the display areas.

10. The image processing circuit of claim 9, wherein if each of the current curve indices corresponding to one of the display areas is associated with the local reference indices corresponding to the one of the display areas and the display areas adjacent to the one of the display areas, the number of the display areas adjacent to the one of the display areas applied by the curve index generator is in inverse proportion to each of the local reference indices corresponding to one of the display areas.

11. The image processing circuit of claim 1, wherein which are selected to be the corresponding one or more gray-level transformation curves from the gray-level transformation curves corresponding to each pixel are determined according to a respective location relationship between the pixel and the display areas.

12. An image contrast enhancement method of an image processing circuit, comprising:
providing a plurality of local curve indices corresponding to a plurality of display areas of a display panel by an index generating unit according to a plurality of pixel data of a first frame, wherein each of the pixel data respectively corresponds to one of the display areas and each of the display areas includes a plurality of pixels, if the first frame and a preceding second frame are continuous frames, providing the local curve indices respectively corresponding to the display areas according to current curve indices and preceding curve indices corresponding to the display areas, and if the first frame and the second frame are not continuous frames, a curve index generator allowing the local curve indices respectively corresponding to the display areas are determined to be the current curve indices corresponding to the display areas;
selecting one or more gray-level transformation curves from a plurality of gray-level transformation curves for each pixel by a data compensation unit according to the local curve indices, after regulating the pixel data for each pixel according to a respective gray-level transformation curve for the pixel, wherein the respective gray-level transformation curve for one of a part of the pixels is one of the gray-level transformation curves corresponding, and the respective gray-level transformation curve for one of another part of the pixels is an interpolation result of at least two gray-level transformation curves of the gray-level transformation curves;
providing a plurality of compensated pixel data; and
determining at least one data gain by a data gain unit according to a backlight duty cycle signal and regulating the compensated pixel data according to the at least one data gain, so as to provide a plurality of enhanced pixel data.

13. The image contrast enhancement method of claim 12, wherein the gray-level transformation curves are different from each other or one another.

14. The image contrast enhancement method of claim 12, wherein
if each of the pixel data is written into a central pixel of one of the display areas, each of the pixel data corresponds to one of the gray-level transformation curves,
if each of the pixel data is written into a target pixel located on a straight line constituted by the central pixels in two adjacent display areas of the display areas, each of the pixel data corresponds to the gray-level transformation curves corresponding to the central pixels in the two adjacent display areas, and
if each of the pixel data is written into the target pixel located in a block constituted by the central pixels in four adjacent display areas of the display areas, each of the pixel data corresponds to the gray-level transformation curves corresponding to the central pixels in the four adjacent display areas.

15. The image contrast enhancement method of claim 12, wherein
if a backlight brightness indicated by the backlight duty cycle signal is less than or equal to a backlight brightness threshold, the data gain is 1, and
if the backlight brightness indicated by the backlight duty cycle signal is greater than the backlight brightness threshold, the data gain is gradually reduced from 1 to 0 in response to an increase in the backlight brightness.

16. The image contrast enhancement method of claim 12, further comprising:
calculating one of the local curve indices corresponding to each of the display areas according to the pixel data corresponding to the each of the display areas.

17. The image contrast enhancement method of claim 16, wherein the step of calculating the local curve indices corresponding to the display areas according to the pixel data corresponding to the display areas comprises:
providing a plurality of local reference indices corresponding to the display areas according to the pixel data of the first frame;
calculating a plurality of the current curve indices corresponding to the display areas according to the local reference indices; and
providing the local curve indices corresponding to the display areas according to the current curve indices corresponding to the display areas.

18. The image contrast enhancement method of claim 17, wherein the step of providing the local reference indices corresponding to the display areas according to the pixel data of the first frame comprises:
providing each of the local reference indices corresponding to one of the display areas according to a gray-level average and a gray-level standard deviation of the pixel data corresponding to the one of the display areas.

19. The image contrast enhancement method of claim 17, wherein the step of calculating the current curve indices corresponding to the display areas according to the local reference indices comprises:
if each of the local reference indices corresponding to one of the display areas is greater than an index threshold, associating each of the current curve indices corresponding to one of the display areas with each of the local reference indices corresponding to the one of the display areas; and
if each of the local reference indices corresponding to one of the display areas is less than the index threshold, associating each of the current curve indices corresponding to one of the display areas with the local reference indices corresponding to the one of the display areas and the display areas adjacent to the one of the display areas.

20. The image contrast enhancement method of claim 19, wherein in the step of associating each of the current curve indices corresponding to one of the display areas with the local reference indices corresponding to one of the display areas and the display areas adjacent to the one of the display areas,
if each of the current curve indices corresponding to one of the display areas is associated with the local reference indices corresponding to the one of the display areas and the display areas adjacent to the one of the display areas, the number of the display areas adjacent to the one of the display areas applied by the curve index generator is in inverse proportion to the local reference indices of the display areas.

21. The image contrast enhancement method of claim 12, wherein which are selected to be the corresponding one or more gray-level transformation curves from the gray-level transformation curves corresponding to each pixel are determined according to a respective location relationship between the pixel and the display areas.

22. An image processing method comprising:
receiving pixel data of a plurality of pixels in a first frame, if the first frame and a preceding second frame are continuous frames, local curve indices respectively corresponding to display areas are determined according to current curve indices and preceding curve indices corresponding to the display areas, and if the first frame and the second frame are not continuous frames, the local curve indices respectively corresponding to the display areas are determined to be the current curve indices corresponding to the display areas, wherein the current indices are determined by the pixel data of the first frame;
obtaining a respective gray-level transformation curve for each pixel of one or more pixels in the frame according to one or more gray-level transformation curves corresponding to the pixel among a plurality of gray-level transformation curves respectively corresponding to a plurality of display areas, each of the display areas including a plurality of pixels, the respective gray-level transformation curve obtained for one of a part of pixels in the frame is an interpolation result of at least two gray-level transformation curves; and
compensating the pixel data for each pixel by using the respective gray-level transformation curve obtained for the pixel, wherein the compensated pixel data is used for generating data provided to a panel driving circuit to display a corresponding image.

23. The image processing method of claim 22, further comprising receiving backlight information and the compensated pixel data, so as to determine at least one data gain according to the backlight information, and adjust the compensated pixel data according to the at least one data gain to provide a plurality of enhanced pixel data.

24. The image processing method of claim 22, wherein which are the one or more gray-level transformation curves of the gray-level transformation curves corresponding to each pixel is determined according to a respective location relationship of the pixel with the display areas.

25. The image processing method of claim 22, wherein the gray-level transformation curves respectively corresponding to the display areas are arranged to be respective gray-level transformation curves of central pixels of the display areas.

26. An image processing method comprising:
receiving pixel data for each pixel of a plurality of pixels of a first frame, if the first frame and a preceding second frame are continuous frames, local curve indices respectively corresponding to display areas are determined according to current curve indices and preceding curve indices corresponding to the display areas, and if the first frame and the second frame are not continuous frames, the local curve indices respectively corresponding to the display areas are determined to be the current curve indices corresponding to the display areas, wherein the current curve indices are determined by the pixel data of the first frame;
arranging a plurality of gray-level transformation curves to be respective gray-level transformation curves of a plurality of certain pixels of the first frame;
obtaining a respective gray-level transformation curve for each of the other pixels in the first frame according to one or more gray-level transformation curves corresponding to the pixel among the gray-level transformation curves; and
compensating the pixel data for each pixel by using the respective gray-level transformation curve of each pixel, wherein the compensated pixel data is used for generating data provided to a panel driving circuit to display a corresponding image,
wherein the obtaining step comprises:
calculating the respective gray-level transformation curve for each pixel of the other pixels in the first frame as an interpolation result of at least two gray-level transformation curves corresponding to the pixel.

27. The image processing method of claim 26 further comprising receiving backlight information and the compensated pixel data, so as to determine at least one data gain according to the backlight information and adjust the compensated pixel data according to the at least one data gain to provide a plurality of enhanced pixel data.

28. The image processing method of claim 26, wherein which one or more gray-level transformation curves of the gray-level transformation curves corresponding to each pixel of the other pixels is determined according to a location relationship of the pixel with the certain pixels.

29. The image processing method of claim 26, wherein the certain pixels are central pixels within a plurality of display areas of the first frame.

30. An image processing method comprising:
receiving pixel data for each pixel of a plurality of pixels of a first frame, if the first frame and a preceding second frame are continuous frames, local curve indices respectively corresponding to display areas are determined according to current curve indices and preceding curve indices corresponding to the display areas, and if the first frame and the second frame are not continuous frames, the local curve indices respectively corresponding to the display areas are determined to be the current curve indices corresponding to the display areas, wherein the current curve indices are determined by the pixel data of the first frame;
obtaining a respective gray-level transformation curve for each of the pixels in the first frame according to one or more gray-level transformation curves corresponding to the pixel among a plurality of gray-level transformation curves; and
compensating the pixel data for each pixel by using the respective gray-level transformation curve of each pixel, wherein the compensated pixel data is used for generating data provided to a panel driving circuit to display a corresponding image,
wherein the obtaining step comprises:
calculating the respective gray-level transformation curve for one or more pixels in the first frame as an interpolation result of at least two gray-level transformation curves corresponding to the pixel.

31. The image processing method of claim 30 further comprising receiving backlight information and the compensated pixel data, so as to determine at least one data gain according to the backlight information and adjust the compensated pixel data according to the at least one data gain to provide a plurality of enhanced pixel data.

32. The image processing method of claim 30, wherein the obtaining step comprises: arranging the gray-level transformation curves to be respective gray-level transformation curves of a plurality of certain pixels of the first frame.

33. The image processing method of claim 30, wherein which one or more gray-level transformation curves of the gray-level transformation curves corresponding to each pixel of the other pixels is determined according to a location of the pixel.

* * * * *